United States Patent Office 3,514,957
Patented June 2, 1970

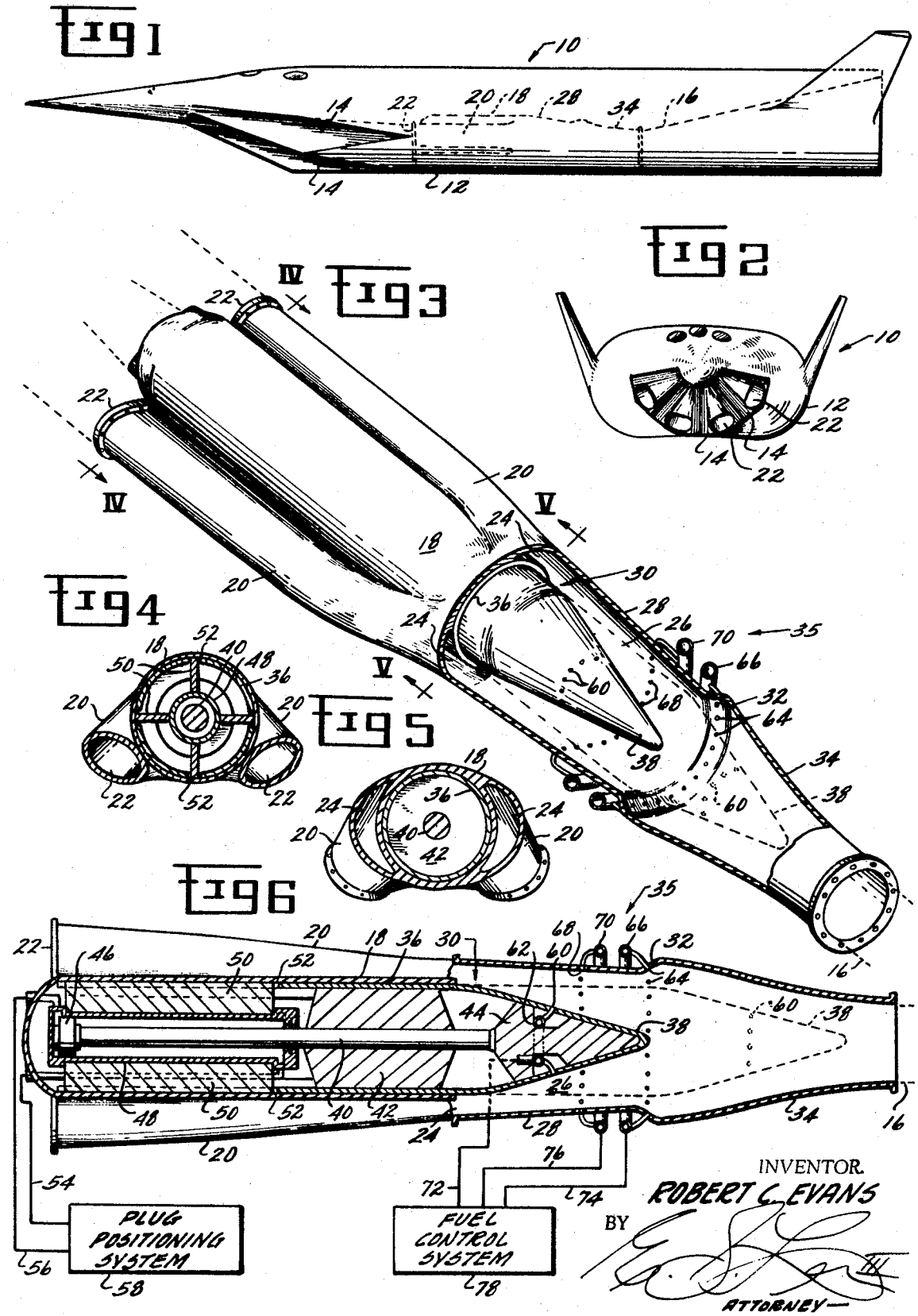

3,514,957
HIGH SPEED PROPULSION ENGINE
Robert C. Evans, Cincinnati, Ohio, assignor to General Electric Company, a corporation of New York
Filed Feb. 27, 1967, Ser. No. 619,892
Int. Cl. F02k 7/08
U.S. Cl. 60—270                 9 Claims

ABSTRACT OF THE DISCLOSURE

The disclosure shows a propulsion engine 12 of the ramjet type. The engine inlet ducts 20 for ram air are formed in such a manner that an internally disposed plug 30, providing an annular flow path through the engine, is supported outside of the flow path to reduce the heat load on the plug 30. With this arrangement, the plug 30 is displaceable for controlling the area change of the flow path to provide efficient operation from supersonic to hypersonic velocities.

---

The present invention relates to improvements in propulsion engines and more specifically to improvements in engines of the ramjet type.

The ramjet engine has long been known as a simplified powerplant for propulsion of high speed aircraft. The ramjet engine usually comprises an open ended duct which admits ram air at one end and pressurizes it in an internal variable area flow path due to the forward motion of the aircraft. It is common practice to form the flow path by means of a longitudinal plug positioned in the center of the duct by means of radial struts. Fuel is mixed with the pressurized air and the resultant mixture ignited. The products of combustion are then accelerated and discharged from the opposite outlet end of the duct to produce a propulsive thrust.

With this type of ramjet engine, the use of the internally disposed plug to contour the engine flow path presents a number of problems. When the ram air is pressurized as it passes through the engine flow path, its temperature is increased which, in some cases, necessitates cooling of the surfaces defining the flow path. The cooling requirements of the plug are relatively large due to the large surface area of the plug exposed to the ram air flow path. In order for heat to be dissipated from the plug, it must be carried through the radial support struts to the exterior of the duct by a circulating cooling fluid system. Since the struts are exposed to an even greater amount of heat, as a result of direct exposure to the ram air flow path, the heat transfer capacity of the fluid is substantially impaired.

In addition to reduced heat transfer effectiveness, the struts may also create aerodynamic disturbances in the flow path which reduce the efficiency of the engine in compressing the ram air.

While the above problems may be tolerable for intermediate sonic aircraft flight velocities, relatively high supersonic velocities greatly aggravate the heat and aerodynamic problems and impair the flexibility of the ramjet engine.

Accordingly, it is an object of the present invention to provide a simplified, effective propulsion engine of the ramjet type which has greatly reduced cooling requirements.

It is a further object to provide a simplified ramjet type engine that is capable of effectively operating over a wide range of supersonic velocities.

The above ends are attained, in one aspect, by a propulsion engine used in an aircraft which has an inlet for capturing ram fluid such as air and a nozzle for discharge of fluid from the engine. The engine comprises a housing which has an upstream and downstream end. Plug means extend from the downstream end of the housing. At least one inlet duct provides a flow path for ram fluid from the aircraft inlet to the downstream end of the housing. The outlet end of the inlet duct generally conforms to and joins the downstream end of the housing whereby the housing is positioned outside of the flow path formed by the duct. A generally annular duct extends from the juncture of the housing and the inlet duct to form, in combination with the plug means, an annular flow path of progressively varying area for pressurizing the ram fluid. Means are provided for increasing the energy level of the pressurized ram fluid. Outlet duct means, downstream of the annular duct, accelerate the fluid for discharge through the aircraft nozzle to produce a propulsive thrust. The plug, therefore, is supported outside of the inlet duct flow path and the area of the plug exposed to the ram fluid is minimized.

In another aspect of the invention, the above aircraft, powered by the propulsion engine, is operable at velocities between supersonic and hypersonic. The plug is displaceable into the duct to form a variable area flow path that most efficiently provides compression of the fluid at that flight velocity.

The above and other related objects and features of the present invention will be apparent from a reading of the following description of the disclosure found in the accompanying drawing and the novelty thereof pointed out in the appended claims.

In the drawing:

FIGS. 1–2 are elevation and front views of a high speed aircraft propelled by engines embodying the present invention;

FIG. 3 is a perspective view of one of the engines used to propel the aircraft of FIG. 1;

FIG. 4 is a view taken on line IV—IV of FIG. 3;

FIG. 5 is a view taken on line V—V of FIG. 3;

FIG. 6 is a longitudinal section view of the engine seen in FIG. 3 further showing, in diagrammatical fashion, controls therefor.

FIGS. 1 and 2 illustrate an aircraft 10 capable of hypersonic (above Mach 5) flight velocities which is powered by a pair of ramjet type engines 12 disposed within the fuselage. Because ramjet type engines only operate after an aircraft is in motion, the aircraft 10 is first accelerated to a relatively high velocity by rockets or a launch aircraft. At this velocity, the air through which the aircraft passes is rammed into a pair of inlets 14 for each engine 12. The inlets 14 are normally fabricated as components of the aircraft to direct air to the engine 12 and, under at least some conditions, pressurize this inlet air. This ram inlet air is pressurized in the engine 12 and fuel then added thereto. The resultant mixture is ignited to increase its energy level. These combustion gases are then accelerated and discharged through divergent aircraft exhaust nozzles 16 to produce a propulsive thrust for the aircraft 10.

Reference is now had to FIG. 3 which shows in perspective view, one of the engines 12. As shown in the figure, the engine 12 is of unitary construction for ease of explanation. The engine 12 comprises a housing 18 which is structurally mounted to the aircraft 10 by suitable means. A pair of inlet ducts 20, having oval upstream ends 22 (see particularly FIGS. 2 and 4), extend from the aircraft ram inlets 14 to the downstream end of housing 18. The downstream ends 24 of the ducts 20 generally conform to and join the housing 18 to form a pair of arcuate outlets 24 (FIG. 5) for ram air into an annular chamber 26 for pressurization. The chamber 26 is formed, in part, by a gradually converging duct 28 extending from the juncture of the inlet ducts and the housing 18. A fuel injection system, generally referred to by reference character 35, injects fuel into the ram air stream at selected location to provide a combustible mixture. The downstream end of duct flares out to form a shoulder which induces turbulence in the ram air mixture to enable combustion in a convergent outlet duct 34.

A plug 30, telescoped into the downstream end of and supported by housing 18 is displaceable into the ducts 28 and 34. The plug 30, as shown in FIG. 6, comprises a cylindrical shell 36 having a conical end portion 38. The shell 36 and conical end portion 38 are secured to a piston rod 40 by lightweight support structures 42, 44, such as honeycomb material. A piston 46, secured to the end of piston rod 40, is displaceable in an actuator 48. The actuator 48 is secured to the housing 18 by four longitudinal support vanes 50, which also guide the movement of plug 30 through the use of longitudinal interfitting grooves 52 in the end of shell 36 (FIG. 4). A pair of conduits 54, 56 extend from opposite ends of the actuator 48 to a plug positioning system 58. The plug positioning system 58 transmits hydraulic pressure signals through conduits 54, 56 to position plug 30 in its illustrated retracted position or its extended position (shown in phantom). In the retracted position, the plug 30 forms, with the duct 28, a divergent annular flow path and the outlet duct 34 forms a convergent annular flow path. In the extended position, the plug 30 forms with the duct 28 a convergent annular flow path and with the outlet duct 34, a divergent annular flow path.

The previously mentioned fuel system 35 comprises a first series of nozzles 60 circumferentially positioned on the conical portion 38 of the plug 30 to inject fuel from a manifold 62 outward into the engine flow path. A second series of nozzles 64 are positioned around the shoulder 32 to inject fuel inward into the duct 34 from a manifold 66. A third series of nozzles 68 are positioned around the duct 28, to inject fuel from a manifold 70 into the flow path through the engine, some distance upstream of the shoulder 32.

The fuel nozzle manifolds 62, 66, 70 are supplied with pressurized fuel from conduits 72, 74, 76 which extend to a fuel control system 78. Since the nozzle manifold 62 is mounted on the displaceable plug 30, the supply conduit 72 has a suitable flexible joint (not shown) to permit movement of the plug 30 and maintain an effective seal against leakage. The fuel control system 78 may be any suitable system that performs the following two functions. The first function is to pressurize and schedule the total amount of fuel through the nozzles to achieve a desired thrust output from the engine 12. In some cases, it may be desirable to have the total fuel flow primarily controlled as a function of operator demand and in other cases, it may be controlled to achieve stoichiometric burning between the fuel and the air. The second of the functions is to selectively inject the fuel through a particular set or sets of nozzles as a function of engine operating conditions to obtain maximum mixing with the fuel before ignition and combustion.

A typical range of aircraft flight velocities for operation of the engine 12 is starting at Mach No. 3 and acceleration to above Mach No. 10. Between the lower limits and intermediate velocity range, the velocity of the air as it enters the combustion zone of the engine 12 is subsonic even though aircraft velocity is supersonic, to achieve efficient operation. For this purpose the plug 30 is near its most retracted position to form a divergent annular flow path to the combustor duct 34 and a transverse shock wave is set up in the inlet ducts 20 which decelerates the air to below sonic and causes its pressure to be increased. The fuel control system causes fuel to be injected into the flow path through nozzles 60 on the plug 30 and nozzles 64 on the shoulder 32. This is done to minimize the distance the fuel from each series of nozzles has to penetrate the ram air flow path to achieve maximum mixing. In addition, the injection of fuel around shoulder 32 enables efficient mixing because of the turbulence that the shoulder 32 induces.

As the fuel-air mixture flows into outlet duct 34, the end of the plug 30 and the shoulder 32 induce a sufficient degree of turbulence to support combustion of the mixture. Combustion may be initiated by suitable means, generally disposed upstream of the shoulder. The combustion gases are then accelerated toward sonic speed by the convergent flow path through outlet duct 34. The outlet throat of duct 34 limits the velocity of the gases to sonic speed or Mach No. 1 and the divergent aircraft exhaust nozzle 16 causes the gases to accelerate above Mach No. 1 to provide a propulsive thrust in a manner similar to the well known convergent divergent exhaust nozzle.

As the aircraft accelerates from the engine starting velocity of Mach No. 3, to the hypersonic velocities, the losses associated with the transverse shock wave which decelerates the air to below sonic velocity increase substantially. For these flight velocities, the plug 30 is extended into the ducts 28 and 34, to enable supersonic flow through the engine to enable efficient operation. Under these conditions the ram air passing through the inlet ducts 20 and chamber 26 remains above sonic, and the plug 30 is positioned to vary the convergence of the chamber 28 to provide the proper degree of deceleration and pressurization of the supersonic ram air.

The fuel control system 78 selectively directs fuel through nozzles 68 into the pressurized system some distance from the shoulder 32 to enable sufficient mixing with the supersonic ram air. Again, suitable means are provided to initiate combustion of the fuel air mixture which is sustained by the turbulence inducing shoulder 32. The resultant supersonic combustion gases are then accelerated at supersonic speeds through the divergent flow path formed by the plug 30 and outlet duct 34. Further acceleration is produced by the divergent aircraft exhaust nozzle 16.

It is apparent from the foregoing discussion that the plug 30, which forms the variable area annular flow path through the engine, is supported by the housing 18 without the need for radial support struts. This greatly minimizes the heat load on the plug for several reasons. The first is that only the movable portion of the plug 30 is immersed in the fluid stream which minimizes the surface area exposed to the high temperature ram air. The second is that cooling of the exposed portion may be accomplished by circulating cooling fluid through the plug without passage through relatively thin struts exposed to the high temperature ram air stream.

Additional benefits accrue because the aerodynamic loading on the plug 30 is easily resisted by the housing 18 which may be constructed for sufficient strength without incurring any aerodynamic penalty in the inlet ducts 20.

While the engine 12 has been described in terms of a fuel burning ramjet engine, it is to be understood that the present invention is not so limited but may be applied broadly to air breathing propulsion engines with equivalent advantages. Other applications and modifications will occur to those skilled in the art without departing from the spirit and scope of the present invention which is to be derived solely from the following claims.

Having thus described the invention, what is claimed as novel and desired to be secured by Letters Patent of the United States is:

1. A propulsion engine for use in an aircraft having an inlet for capturing ram fluid and a nozzle for discharge of fluid from said engine, said engine comprising,
   a plug housing having upstream and downstream ends,
   plug means extending from the downstream end of the plug housing,
   an annular duct, downstream of said housing, forming an annular flow path of progressively varying area in combination with said plug means, to pressurize the ram fluid, inlet duct means having an upstream end with an opening for connection with the aircraft inlet, said opening being non-annular and, when viewed in a plane normal to the plug housing, having a total angular extent substantially less than 360°, thereby isolating the upstream end portion of the plug housing from the fluid stream, said inlet duct means gradually transitioning in angular extent from its opening to a full annular flow path connecting with the annular flow path surrounding said plug means, means for increasing the energy level of the pressurized ram fluid, and outlet duct means downstream of said annular duct for accelerating said fluid for discharge through said aircraft nozzle to produce a propulsive thrust.

2. A propulsion engine as in claim 1 wherein, said engine inlet duct means comprise a pair of ducts, said housing is cylindrical,
said ducts have generally arcuate outlet ends conforming to the downstream end of said housing.

3. A propulsion engine as in claim 1 wherein, said plug means is displaceable between a first position in which said plug and said duct form a diverging flow path and a second position in which said plug and said duct form a converging flow path, whereby said engine may be efficiently operated over a range of aircraft velocities.

4. A propulsion engine as in claim 3 wherein said aircraft is operable at velocities from supersonic to hypersonic and wherein,
said engine further comprises:
means for maintaining said plug in said first position when the aircraft velocity is supersonic and for maintaining said plug in said second position when the aircraft velocity is hypersonic,
whereby when said aircraft velocity is supersonic, shock waves normal to the flow path through said inlet duct means pressurize and decelerate said supersonic ram fluid to below sonic velocity and said divergent flow path further pressurizes and decelerates said fluid, and
further, whereby when said aircraft velocity is hypersonic, said conversion flow path pressurizes and decelerates said fluid.

5. A propulsion engine as in claim 4 wherein,
said outlet duct means converges towards its downstream end,
said plug is generally cylindrical having a conical end portion,
said plug is displaceable between said first position wherein the outlet duct means is convergent and said second position wherein the conical portion of said plug forms a divergent flow path in combination with said outlet duct.

6. A propulsion engine as in claim 5 wherein,
said annular duct gradually converges towards its downstream end, and
said outlet has a greater convergence than said annular duct.

7. A propulsion engine as in claim 5 wherein said means for increasing the energy level of said fluid comprises:
means for mixing fuel with said ram fluid,
means for inducing sufficient turbulence in fuel-fluid mixture for sustaining combustion,
means for igniting said fuel-fluid mixture,
whereby the energy level of said fluid is increased.

8. A propulsion engine as in claim 7 wherein,
said turbulence inducing means comprises a downstream facing shoulder positioned between said annular duct and said outlet duct,
said means for mixing fuel with said ram fluid comprises:
a first series of nozzles positioned around the conical end portion of said plug for injecting fuel outward into the flow path for ram fluid,
a second series of nozzles positioned around the shoulder for injecting fuel inward into said outlet duct,
a third series of nozzles positioned around said annular duct for injecting fuel radially inward into the flow path for ram fluid upstream of said shoulder,
said engine further comprises means for selectively supplying fuel to said nozzles so that said fuel is completely mixed with said ram fluid over the full range of aircraft velocities.

9. A propulsion engine as in claim 8 wherein said fuel supplying means comprises:
means responsive to the mode of operation for selectively supplying fuel to said first and second series of nozzles when said aircraft velocity is supersonic and for selectively supplying fuel to said third series of nozzles when said aircraft velocity is hypersonic.

References Cited
UNITED STATES PATENTS

| | | | |
|---|---|---|---|
| 2,637,972 | 5/1953 | Laucher | 60—261 |
| 2,867,977 | 1/1959 | Buck | 60—270 |
| 3,080,707 | 3/1963 | Vetter | 137—15.1 |

SAMUEL FEINBERG, Primary Examiner

U.S. Cl. X.R.

60—235, 242, 271; 137—15.2